United States Patent Office 3,738,972
Patented June 12, 1973

3,738,972
PROCESS FOR PRODUCTION OF STYRENE/
ACRYLONITRILE COPOLYMERS
Kizyu Moriyama and Sakae Takahashi, Osaka, Japan,
assignors to Daicel Ltd., Osaka, Japan
No Drawing. Filed Aug. 26, 1971, Ser. No. 175,378
Claims priority, application Japan, Aug. 28, 1970,
45/75,409
Int. Cl. C08f 15/04, 15/22
U.S. Cl. 260—85.5 R                             2 Claims

ABSTRACT OF THE DISCLOSURE

Suspension polymerization of a styrene-acrylonitrile polymerization mixture is carried out while adding styrene to the polymerization mixture until the conversion of monomers to copolymer reaches 40 to 70%. An inert gas is passed through the polymerization system after the conversion has reached 75 to 85% to remove excess acrylonitrile, whereby there is obtained a styrene-acrylonitrile copolymer having a uniform homogenous composition.

BACKGROUND OF THE INVENTION

Field of the invention

This invention relates to a process for the production of styrene-acrylonitrile copolymers of uniform homogenous composition. More specifically, it relates to a process for the production of copolymers of styrene and acrylonitrile having a uniform composition by the suspension polymerization method.

Description of the prior art

In conducting the copolymerization of a mixture of styrene and acrylonitrile in an aqueous medium, acrylonitrile having a relatively high water-solubility is distributed at an equilibrium concentration both in the styrene phase and in the aqueous phase at the initial stage of the polymerization, but as the polymerization proceeds and the copolymer is formed in the monomer phase, this equilibrium distribution of the acrylonitrile changes and some of the acrylonitrile dissolved in the aqueous phase transfers into the copolymer-monomer phase.

Further, in general, it is only when an azeotropic polymerization starting mixture is used that the composition of the copolymer formed throughout the course of the copolymerization is homogeneous and corresponds with the composition of the starting mixture. When a monomer mixture of a nonazeotropic composition is copolymerized, the composition of the resulting copolymer formed throughout the course of the polymerization differs from the composition of the starting mixture. Accordingly, as the copolymerization proceeds, the proportions of unreacted monomers in the polymerization mixture vary and, in turn, the composition of the resulting copolymer also varies. More specifically, at the initial stage of the polymerization there is formed a copolymer which contains a higher ratio of the monomer which polymerizes at a faster rate and, hence, is consumed at a higher rate. On the other hand, at the terminal stage of the polymerization there is formed a copolymer which contains a higher ratio of the monomer which polymerizes at a relatively low rate and hence, is consumed at a lower rate. Thus, the copolymer formed during the course of the polymerization is not of uniform, homogeneous composition.

In the case of styrene-acrylonitrile copolymers, such heterogeneous monomer distribution results in an extreme reduction of the mechanical strength, heat resistance, color, chemical resistance, transparency, moldability and other properties of practical importance. Therefore, in order to improve these properties, it is necessary to make the composition of the copolymer uniform and homogeneous. For this purpose, it is desired to maintain the composition of the unreacted monomers in suspended practicles at a selected level throughout the polymerization from the initial stage to the terminal stage.

As means for attaining the above object, there have been proposed the following methods.

(1) A method comprising stopping the polymerization at a time when the monomer composition has not yet begun to vary to a great degree from the starting composition and removing the unreacted monomers from the polymerization system.

(2) A method comprising continuously adding the monomer which is consumed at a relatively high rate in order to maintain the monomer composition at a selected certain level.

(3) A method comprising continuously withdrawing the monomer which is consumed at a relatively low rate, by means of inert gases or steam distillation, etc. either continuously during the course of the polymerization or at least during the later stage of the polymerization.

However, these methods are not effective, when actually applied to the suspension polymerization of a mixture of styrene and acrylonitrile. More specifically, in the method (1), the polymerization efficiency is extremely low. In the method (2), because the viscosity of the suspended particles is extremely high after the conversion to polymer has proceeded to a substantial extent (40 to 70% or higher conversion of monomers to copolymer), it is difficult to diffuse the freshly added, more rapidly polymerizable monomer (styrene) into the suspended particles. Further, in the method (3), in order to obtain a copolymer of a uniform homogeneous composition, it is necessary to remove a large amount of the slower polymerizing monomer (acrylonitrile) (for instance, in the process disclosed in Japanese patent publication No. 11,644/67, 175 g. of acrylonitrile is used and 51.5 g. (about 30%) of unreacted acrylonitrile is withdrawn), and therefore, the polymerization efficiency is very low. Because of these defects, each of these methods is industrially disadvantageous.

With a view to developing a process free of such defects, we have discovered that, in the suspension polymerization of a mixture of styrene and acrylonitrile, if, during the period beginning with the initiation of the polymerization and extending to the stage at which the conversion to copolymer is not so high and the viscosity of the suspended particles is not so high, styrene is continuously added to the polymerization system, the thus added styrene is very easily diffused and incorporated in the suspended particles. Hence, the monomer composition can be maintained at a constant level. This in turn, results in the maintenance of a substantially constant copolymer composition in all of the copolymer formed during the course of the copolymerization. When the viscosity of the suspended particles increases as a result of a further increase of the conversion of monomers to copolymer, the temperature of the polymerization system is raised and an inert gas is continuously introduced and passed through the polymerization system, whereby excess acrylonitrile contained in the aqueous phase and in the suspended particles is removed by the inert gas and is thus withdrawn from the polymerization system until the polymerization reaction is completed. Thus, when the removal of acrylonitrile is effected subsequent to the addition of styrene in such a manner as described above, the amount of acrylonitrile to be removed during the whole process can be greatly reduced as compared with the case when only the removal of acrylonitrile is effected and no styrene is added. For example, when acrylonitrile is used in an amount of 5000 g., only 70 g. (about 1.4%) of unreacted acrylonitrile need be removed. As a result the polymerization efficiency is greatly improved. It has been found, surprisingly in view of the prior art, that by this unique method, the composition of the resulting copolymer formed throughout the entire course of the polymerization reaction can be made to be of a very high uniformity and homogeneity.

SUMMARY OF THE INVENTION

Accordingly, this invention provides a process for the production of styrene-acrylonitrile copolymers having a uniform, homogenous composition by the suspension polymerization of a mixture of styrene and acrylonitrile in an aqueous medium, in which styrene is added during the period beginning with the initial stage of the polymerization and extending to the stage at which the conversion (of monomers to copolymer) reaches 40 to 70%, and then an inert gas is introduced into and is passed through the polymerization system after the conversion has reached 75 to 85%, to thereby effect the partial removal of acrylonitrile.

In this invention, the ratio of total styrene (initial amount plus amount added during polymerization) to acrylonitrile in the polymerization mixture is not critical, so long as the amount of acrylonitrile is greater than that found in the azeotropic mixture (in which styrene: acrylonitrile=76:24 (percent by weight)). But, it is generally preferable that the ratio of total styrene:acrylonitrile is in the range of 65–76:35–24 (percent by weight). The ratio of styrene charged into the polymerization system before the initiation of polymerization/styrene added after the initiation of polymerization is generally 3–1/1, preferably about 2/1, i.e., from 50% to 75% of the total styrene is added to the initial polymerization mixture and the balance is added during the period between the initiation of polymerization and ending when the conversion of monomers to copolymer reaches from 40 to 70%.

The addition of styrene should be conducted during the period beginning with the initial stage of the polymerization to the stage at which the conversion of monomers to copolymers reaches at least 40%. If the addition of styrene is stopped when the conversion to copolymer is below 40%, the amount of acrylonitrile that must be withdrawn so as to obtain a copolymer of a uniform homogeneous composition is greater and one of the advantageous features of this invention cannot be obtained. If the addition of styrene is conducted after the conversion to copolymer exceeds 70%, the added styrene is not uniformly incorporated in the suspended particles so that the copolymer composition is not maintained uniform and homogeneous. The rate of feeding the additional styrene is adjusted depending on the polymerization rate. It is sufficient to carry out the addition of styrene before the conversion to copolymer reaches 40 to 70%, but in order to obtain a copolymer of a highly uniform homogeneous composition, it is desirable to continuously feed styrene at a constant rate until the conversion reaches 40 to 70%.

The amount of water to be used as the suspension medium is in the range of 2 to ½ part by weight, per part by weight of the sum of total styrene and acrylonitrile. It is preferred that the weight of water is approximately equal to the total weight of styrene and acrylonitrile. As the suspension stabilizers, there may be conveniently used conventional inorganic and organic compounds employed in this field, such as calcium phosphate, magnesium hydroxide and polyvinyl alcohol. As the polymerization initiator there may be used known peroxide initiators such as benzoyl peroxide, lauryl peroxide, tertiary butyl perbutyrate and dicumyl peroxide. In addition, azobisisobutyronitrile and the like may be used. The process of this invention can be practised by employing, if required, surface active agents, chain regulators, heat stabilizers, coloring materials, plasticizers and other additives.

In the process of this invention, at the stage when the conversion of monomers to copolymers reaches 75 to 85%, excess acrylonitrile is removed. For this purpose, an inert gas is employed. If the removal of acrylonitrile is effected before the conversion reaches 75%, an unnecessarily large amount of acrylonitrile must be removed and one of the advantageous features of this invention cannot be obtained. On the other hand, if the removal of acrylonitrile is effected for the first time after the conversion exceeds 85%, a copolymer of a highly uniform homogeneous composition cannot be obtained. Any inert gas which will not exert any bad influence on the polymerization reaction can be used in this invention. In general, there can advantageously be used nitrogen gas, carbon dioxide gas and steam. The inert gas is introduced from a gas bomb or a gas holder. As the steam source there may be used a steam generating tank. The inert gas source is connected to the polymerization vessel and the inert gas is introduced into the polymerization system. By maintaining the flow rate of the inert gas passing through the polymerization system at a constant level and by elevating the temperature of the polymerization system, the excess acrylonitrile will be expelled from the polymerization system and at the same time the polymerization reaction will be completed. The inert gas containing entrained acrylonitrile is withdrawn from the reaction system and is separated from acrylonitrile by means of a recovery condenser or the like. Then, both the inert gas and acrylonitrile can be recycled and used repeatedly, which results in an economic advantage. It is preferable to blow the inert gas through the suspension in the polymerization system, but it is possible to allow the inert gas to pass over the liquid surface according to need. It is desired to use an inert gas preheated to a temperature approximating the temperature of the polymerization system, whereby the lowering of the polymerization temperature by the introduction of the inert gas can be prevented.

In this invention, the polymerization temperature is not critical, but it is generally preferred to conduct the polymerization at 60 to 90° C.

According to the process of this invention, it is easy to maintain the monomer composition at a predetermined constant level throughout the polymerization, and therefore, the composition of the resulting polymer formed through the entire course of the polymerization is very uniform and homogenous. Accordingly, it is possible to produce styrene-acrylonitrile copolymers which are excellent in their properties such as mechanical strength, heat resistance, chemical resistance, color transparency and moldability. Hence, the copolymer products have a very high commercial value and they can be produced very easily on an industrial scale at a high polymerization efficiency and with good reproducibility.

The invention will now be explained by referring to the following illustrative example. It will be understood that this invention is not limited by this example.

EXAMPLE

A jacketed, glass-lined polymerization vessel equipped with a stirrer, a device for blowing in an inert gas, a device for feeding additional monomer and a recovery condenser was charged with 730 g. of calcium chloride, 60 g. of primary potassium phosphate, 18 g. of "Monogen LH" (sodium sulfonate of higher alcohol manufactured by Daiichi Kogyo Seiyaku Co. Ltd., Japan) and 44.2 kg. of deionized water. The mixture was heated at 55° C. with stirring. Then, a solution of 2.36 kg. of secondary sodium phosphate dodecahydrate in 15.8 kg. of water was gradually added to the mixture to form an aqeous medium containing 900 g. of secondary calcium phosphate as the suspension stabilizer. Then, it was heated to 70° C. and a mixture of 28 kg. of styrene, 18 kg. of acrylonitrile, 198 g. of lauryl peroxide and 150 g. of tertiary dodecyl mercaptan was charged into the vessel with stirring to initiate the polymerization. Ten minutes after the initiation of the polymerization, the introduction of additional styrene was commenced and contnued until 5 hours had passed from the initiation of the polymerization. The amount of styrene fed during this period was 14 kg. and the addition was effected continuously dropwise at a rate of 2.8 kg./hr. At the time of the completion of the addition of styrene, the conversion of monomers to copolymer was 60%. The polymerization was continued for a further period of 1 hour and 20 minutes at the above temperature. At this stage the conversion was 80%. Then, a nitrogen gas was introduced in the aqueous suspension at a rate of 3 m.$^2$/hr. and, while the flow of nitrogen continued, the polymerization was further continued for 4 hours. During this period the temperature was maintained at 70° C. and it was then raised from 70° C. to 80° C. over a period of 2 hours. Then, the temperature was maintained at 80° C. to complete the polymerization. Then, the reaction mixture was cooled below 40° C. and 1.8 kg. of 35% hydrochloric acid was added thereto. Then the mixture was agitated for about 30 minutes, and the precipitated copolymer beads were separated by filtration and dried.

The results of measurements of the acrylonitrile (AN) content in copolymer samples taken at various times during the above-described polymerization reaction, determined by elementary analysis, are shown in the following table.

| Polymerization time (hour): | AN content in copolymer (percent by weight) |
|---|---|
| 2 | 26.53 |
| 4 | 26.75 |
| 6 | 26.64 |
| 8.30 | 26.57 |
| Final stage | 26.78 |

The embodiments of the invention in which an exclusive property or privilege is claimed are defined as follows:

1. A process for producing styrene-acrylonitrile copolymer having a substantially uniform composition, which comprises: polymerizing in a suspension polymerization system a monomer mixture of styrene and acrylonitrile suspended in an aqueous medium, the monomer mixture containing at the start of the polymerization from 50 to 75% of the total styrene supplied to the polymerization system during the polymerization, adding the balance of the styrene to the polymerization system during the period beginning with the initial stage of the polymerization and extending to the stage at which the conversion of monomers to copolymer reaches 40 to 70%, then introducing and passing inert gas through the polymerization system after the conversion of monomers to copolymer has reached 75 to 85% to effect partial removal of excess acrylonitrile from the polymerization system, the total amounts of monomers supplied to the polymerization system consisting of from 65 to 76% by weight of styrene and 35 to 24% by weight of acrylonitrile.

2. A process according to claim 1, in which the temperature of the polymerization system is increased when the inert gas is passed through the polymerization system.

References Cited

UNITED STATES PATENTS

| 2,941,985 | 6/1960 | Amos et al. | 260—85.5 HC |
| 3,491,071 | 1/1970 | Lanzo | 260—85.5 P |
| 3,547,857 | 12/1970 | Murray | 260—85.5 R |

HARRY WONG, Jr., Primary Examiner